Aug. 15, 1950     I. E. BANKEY     2,519,014
COMPOUNDING AND MOLDING MACHINE
Filed May 20, 1946
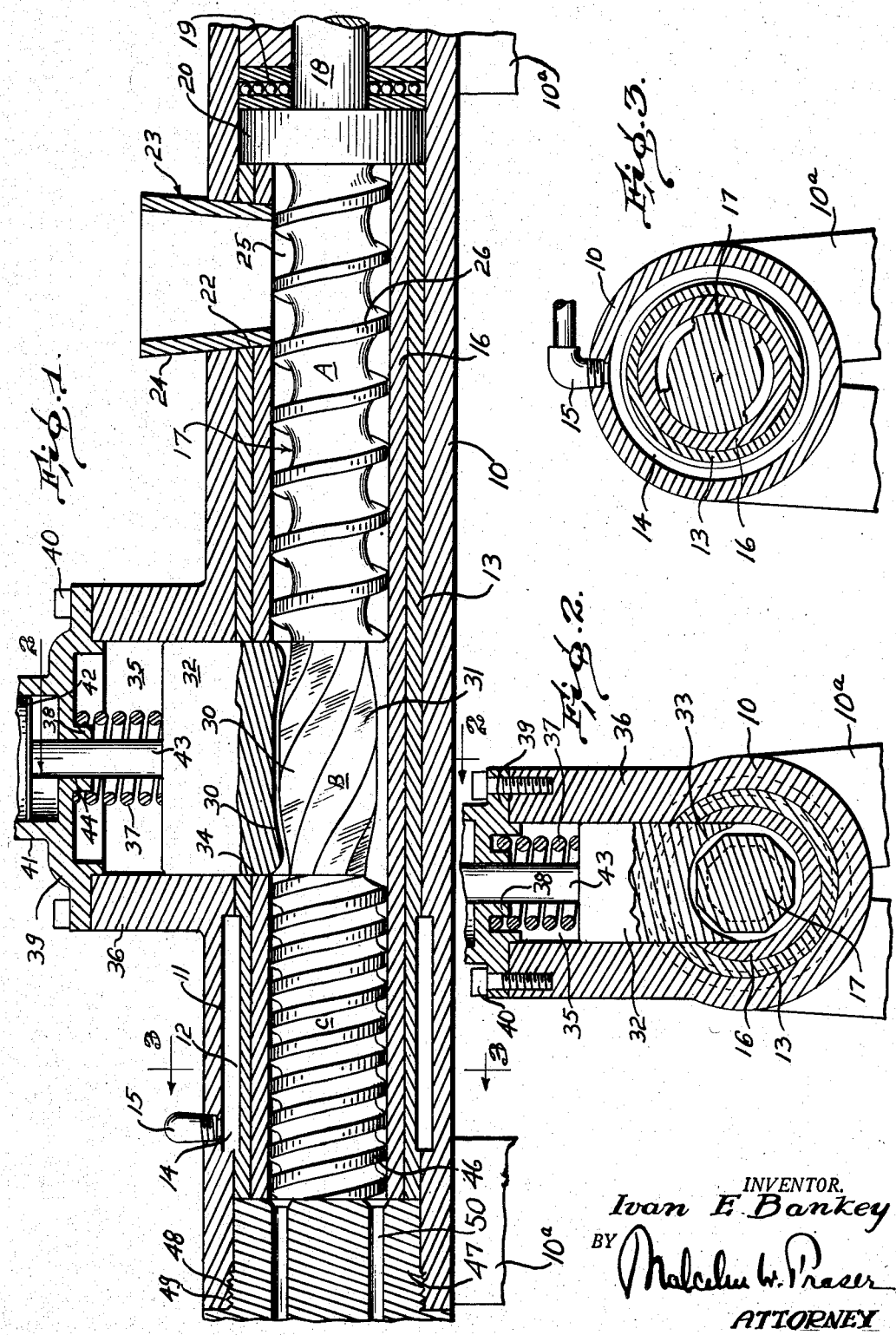
INVENTOR.
Ivan E. Bankey
BY Malcolm W. Fraser
ATTORNEY Patented Aug. 15, 1950

2,519,014

UNITED STATES PATENT OFFICE 2,519,014

COMPOUNDING AND MOLDING MACHINE

Ivan E. Bankey, Toledo, Ohio, assignor, by mesne assignments, to The Lucas County Bank, Toledo, Ohio, a corporation of Ohio Application May 20, 1946, Serial No. 670,947

18 Claims. (Cl. 18—2)

This invention relates to a machine for compounding and fabricating plastics or rubber-like materials and particularly, in part, to a unit for continuously processing resinous or rubber-like compositions from their raw materials to a finished fabricated product.

Heretofore, materials of the type described have been processed and fabricated by individual step-wise operations or in what might be termed batch methods. For example, in the processing of most plastics, the various raw materials are first blended and ground to small particle size in individual dry mills or blenders. Thereafter, predetermined weighed amounts of the blended raw materials are further homogenized and densified between heated differential rolls or a masticator of the Banbury type, from which the densified plastic compound is removed as a hot plastic sheet or massive chunks. Before the molding composition can be further fabricated into a molded article, it is necessary to cool down the sheet or chunk to a brittle stage so that they may be granulated uniformly to feed into the fabricating equipment, such for example as an extruder, injection machine or upright compression press. In the subsequent molding operation the granules, whether thermosetting or thermoplastic, are re-heated in the fabricating machine for rendering the materials plastic enabling flow and fusion into a molded article conforming to the contour of the mold form. When processing by the extrusion method, the granulated thermoplastic molding compound is fed either cold or pre-heated into the feed hopper and conducted by the enclosed screw through a heating zone where the material is first rendered again plastic and then propelled through appropriate dies secured to the head of the extruder.

In the above, description is briefly made to the most simplified, though basic steps, in the manufacture and fabrication of most filled and modified thermosetting and thermoplastic molding compositions including plastics, rubber or the like. It is, however, manifest that the batch method involves the use of considerable labor, numerous and various individual pieces of equipment, and a great deal of floor space for the positioning of the equipment and the storage of material between operations. It is readily understood that a means combining some of the operations or entirely eliminating others not only will result in the reduction of the number and types of processing machines, but will also greatly reduce the floor space, power and the labor required. For example, molding a plastic compound delivered as a hot plastic material directly from the rolls or Banbury to the fabricating machine, eliminates the intermediate cooling, granulation, feed and reheating steps. In this instance, also, more efficient use is made of the heat generated in the various stages of the process substantially to increase the output with concomitant reduction of the power input.

Molding materials produced by the present batch process necessarily vary from batch to batch. For purposes of obviating some of the variability, which greatly influences the molding operation and the resulting products, blenders adapted to receive several batches of processed compound are used subsequent to the granulation operation. Manifestly, a continuous operation in which the raw materials are fed at a constant rate and in a definite proportion to the compounding units and there processed under constant conditions so as to eliminate variabilities in material proportions, reactivity, or methods of handling, results in the production of a uniform molding powder, or else in uniform molded products if the fabrication unit is attached directly to and forms a part of the machine.

It is an object of this invention to produce a new and improved machine for compounding and fabricating molding materials as a unit operation.

Another object of this invention is a machine which continuously operates to compound and mold plastic or rubber-like compositions without intermediate handling.

A further object is to produce a machine which within itself operates as a blender, conveyor, masticator and molder in the production of molded articles from their raw materials.

A still further object is a plastic compounding and fabricating machine which operates simply and continuously to produce a uniform molding compound or molded article at a minimum of cost, labor and floor space.

Other objects and advantages will hereinafter appear and for purposes of illustration but not of limitation, an embodiment of the invention is shown in the accompanying drawings in which, Figure 1 is a longitudinal sectional view of the essential elements comprising the machine in this invention.

Figure 2 is a sectional elevational view taken on the line 2—2 of Figure 1, and

Figure 3 is a sectional elevational view taken along the line 3—3 of Figure 1.

In carrying out this invention, I have made use of a screw conveying principle for successively conducting the plastic materials through the various fabricating steps of weighing, mixing, densifying, masticating and molding; each function being performed in cooperation with the rotatable screw. In the same manner the machine, hereinafter described, may be used with equal facility for the compounding of thermosetting molding materials subsequently to be granulated and then molded in other suitable equipment. In this instance, I made use of the elements described for successively conveying the molding composition through the mixing, masticating and resin advancing stage, and then, finally, delivery to the cooling and granulation means.

Referring now to the drawings, stanchions 10a, comprising a part of a base, support the forward and rearward end portions of a horizontally disposed outer tubular jacket 10 of cast iron or the like, having a groove 11 in the forward position contiguous with a similar groove 12 formed in the forward peripheral surface of a tightly fitting sleeve 13 disposed within the outer jacket. The contiguous grooves 11 and 12 provide a cavity 14 about the housing enabling the transmission of fluids therethrough from a hose coupling 15 for the addition or removal of heat from that portion of the barrel as required. Disposed within the sleeve 13 is a removable liner 16 in the form of a press fit sleeve preferably comprised of a hard, resistant material, such as stainless steel, Z-nickel or chromium plated iron or the like to resist the action of such corrosive plastic materials as the halogenated resin compounds of the group containing vinyl chloride, vinylidene chloride or the like that release a small amount of corrosive hydrochloric acid during processing.

The nerve center of the machine resides in a screw 17 rotatably mounted within the liner 16 so that the peripheral surfaces of threads in the conveyor sections bear against the inner wall of the liner 16. For purposes of performing the various operations on the materials, the screw is arranged in three sections, A, B and C hereinafter described. Normally, the elongated screw is machined from highly resistant hard metals similar to those comprising the liner 16 and for some purposes the screw may be machined from tubular stock so as to provide a hollow shaft enabling cooling or heating fluids to be disposed therein as required.

In operation, the screw is rotated in a counterclockwise direction by means of a drive shaft 18 supported by an anti-friction bearing 19 and an integral bushing 20 positioned between the bearing 19 and the rearward ends of the sleeve 13 and liner 16. The rate of rotation of the screw may be varied by a variable drive disposed between the motor and the drive shaft so that the output of the machine may be selectively controlled to conform to the molding process.

Apertures through the upper rearward end portion of the jacket 10, sleeve 13 and liner 18, respectively, are arranged in registry, providing an opening 22 for the receipt of a feed hopper 23 having upright side walls 24. Manifestly, the dry granular or powder materials in the hopper automatically flow in response to gravitational forces to fill the interstices 25 between the screw threads 26 and the liner wall, and thereafter rotational movements of the screw 17 causes the displacement of the material in the forward direction enabling more materials to flow into the released space between the screw threads. In this manner, the dry materials are continuously and uniformly received and displaced in the forwardly direction. For this purpose, section A of the screw is provided with multiple parallel threads having a long lead and operates as a feeder section. In this section, the materials fed are not only positively conveyed to the next processing section but the materials themselves are further blended and broken down in view of the increased friction and pressures generated as the material progresses lengthwise along the screw. However, not so much friction is created between the dry materials and the metallic surfaces as to generate heat sufficient to soften or plasticize the resins. If the compound is rendered prematurely plastic, adhesion to the screw may occur, causing the materials to bridge and impair the uniform flow and feed. It is for this reason that the screw is often channeled for cooling purposes militating against adhesion thereto.

The intermediate integral portion of the screw 17, section B, is polygonal in transverse cross section and curvilinear in longitudinal cross section and is provided with fast lead threads 30. Since the cross section of the screw in section B is somewhat less than that of the adjacent sections A and C, a spaced relation exists between the screw threads 30 and the enclosing liner 16 enabling the materials disposed therein to be intermixed and to flow unguided in all directions as in a kneading mixer, Banbury, masticator or the like. The clearance about the upper portion of the screw in section B is partially taken up by a ram 32 the lower edge portion 33 of which is arcuate in transverse cross section and curvilinear in longitudinal cross section substantially to conform to the contour of the adjacent partially enclosed screw.

A rectangular registered opening 34 through the upper portion of the liner, sleeve and jacket respectively, enables the tightly fitting ram to be adjusted vertically in the direction toward or away from the rotating screw. The registered openings are contiguous with another similarly dimensioned opening 35 enclosed by a housing 36 forming an integral part of and extending upwardly from the outer jacket 10. As illustrated, the ram is urged in the direction toward the screw by means of a coil spring 37 having one end bearing against the upper surface of the ram, the other end seating about a depending sleeve 38 forming an integral part of an enclosing cover 39 secured to the upper surface of the housing 36 by means of bolts 40. Another sleeve 41 in the form of a cylinder extends upwardly from the central portion of the cover section 39 and receives a circular plate or piston 42 slideable vertically therein and integrally connected to the ram by means of a connecting rod 43 passing through an aperture 44 in the cover section. The connecting rod 43 is disposed within the coil spring 34 for guiding and reinforcing purposes. In addition to the spring forces, the ram may be urged in the direction toward the screw by means of weights or fluid pressure operating against the upper surface of the circular plate or piston 42.

The adjacent integral screw portion, section C, operates again as a conveyor and is provided with threads 46 of narrower pitch, the peripheral surfaces of which abut the liner 16. Herein the masticated material is conveyed to a mold die 47 having a threaded peripheral portion 48 adapted to engage a threaded portion 49 on the inner end of the outer jacket 10 completely to enclose the end of the opening through the machine. The inner end of the mold die 47 is adapted to abut the outer end of the inner sleeve and liner 16 whereby securely to position them in the assembled relation. In this instance, the mold die is provided with multiple longitudinal apertures 50 through which the materials are forced, the extruded strips conforming substantially to the cross sectional contour of the apertures.

In view of the fact that the volume of material receivable between the threads in section C is substantially less than that in section A considerable pressures are built up therebetween in section B to effect the densification of the material so that the amounts conveyed are equal on the weight bases. It is this intermediate built-up pressure in combination with the pressure exerted by the adjustable ram which comprises the forces effecting the intense kneading action in the masticating section resulting in such frictional forces as to substantially increase the temperature of the materials therein, as well as to disintegrate the fillers and homogenize the entire composition. In some instances, as with bulky voluminous materials, the densification ratio may rise as high as 8-to-1 though normally the materials are densified in the range of 3-to-1 by volume.

In operation the machine may be used to process raw materials into fabricated resinous or rubber-like articles of manufacture. Description will here be made to the processing of a filled thermoplastic resinous material but it is understood that filled thermosetting resinous material may equally be densified and advanced continuously to produce a molding compound, and, even in some instances, a thermosetting molded article. In like manner, filled rubber compounds may be masticated and advanced to produce a molding compound or a rubber-like molded article.

Normally the resinous material, fillers, lubricants, pigments and catalysts are first ground and blended to a substantially uniform dry mix before being loaded into the hopper 23. The dry powdery materials naturally flow downwardly to fill the interstices between the screw thread disposed below the hopper. The granular materials are then carried forward in response to the rotational movement of the screw, and the space left vacant is refilled, thereby continuously to subdivide a constant volume of material from the hopper and propel it forward along the barrel or housing.

In view of the span between the threads 26 a large amount of raw material is received and conveyed forwardly to the masticating section. In this section the material is not positively conveyed in any direction as previously pointed out, but instead it is churned by the screw in the more confined space. Since the materials are impelled into the masticating section by the positive screw feed described, return is rendered impossible, building up the pressure within the masticating section, as previously described, causing considerable friction and intermixing action. Responsive to the forces moving the particles under pressure in relation to each other, considerable work is expended which is converted into heat, the generated heat being absorbed by the materials, softening the resins. In the hot plastic stage, the mass acquires a doughy consistency enabling the resins to flow into the voids of the filler and intimately mixing the entire ingredients to form a homogeneous molding compound, the specific gravity of which is considerably increased in view of the densification of the raw materials. Obviously the compressive forces therein may be regulated by the position of the ram in conformance with the needs of the various compounds, the high flow materials of the type containing further reacted resins, resins of higher average molecular weight, resins having a high flow point, or fibrous fillers often require greater pressures, and the voluminous bulky dry powders similarly requiring increased pressures for densification purposes. It is manifest that the kneading action therein operates to break down the fiber structure and to produce a more uniform product.

The incoming materials force a like amount, on the weight basis, of the more densified plastic mass from the masticator section into the conveyor section C, where the plastic mass is conducted by means of the screw action described in combination with the forces of the oncoming materials to the orifice of the mold dies from which it exudes a strip or ribbon of substantially plastic material. Cooling means and conveyors may there be provided for setting and conveying the extruded plastic to sectioning or other processing units. If the plastic mass received from the masticating section is too hot, so that decomposition might occur or else when sufficient viscosity is not obtained for uniform molding, cooling fluids may be circulated through the cavity 14, cooling off that part of the barrel and the material retained therein. Similarly, it may be expedient further to raise the temperature of the plastic mass so that greater fluidity is imparted to the molding compound. For this purpose a stream of hot liquids is continuously passed through the cavity.

Foreign matter such as bolts, stones, nuts or the like are, not infrequently, entrained in the raw material batch, and unless provisions are made for the passage of the article through the unit, entrapment impairing the flow or the breakage of parts occurs. For this purpose, the ram is merely urged toward engagement of the screw by yieldable means, thereby to enable retraction when materials requiring greater forces are encountered, so that the space between the screw and the ram is increased enabling the foreign article to pass therethrough.

Mention has been made of the fact that the described unit may be readily adapted for the continuous production of uniformly advanced thermosetting molding powders thus obviously to provide an advancement in that art, particularly in view of the savings in space, machines and labor coupled with an improvement in uniformity of composition and rate of output. The critical step in the fabrication of thermosetting molding compounds resides in the step where the raw materials are simultaneously blended, advanced and densified, the variations in pressure, temperatures and time having a controlling influence on the properties and characteristics of the resulting molding compound. Heretofore, manual operation of the Banbury or differential rolls wherein the mastication process is conducted results in differences from batch to batch often causing some material to be unsuitable for the fabrication of articles in the prescribed manner.

Continuous processing in the machine described may be readily effected so that the time of exposure at elevated temperatures may be conveniently controlled by means of a variable drive in connection with the screw. The pressures operating on the material in the masticating section may be regulated for uniformity throughout the process, and as the unit assumes constant conditions, the temperature thereafter remains constant so that variations in the quality of production are substantially eliminated. The extruded ribbon of densified and advanced molding compound is ideally situated for uniform cooling and grinding in any one of numerous granulating machines.

It is to be understood that various modifications of screws and cylinder walls may be made to effect desired results such, for example, as increasing or decreasing the pitch diameter of the multiple parallel screw threads, as well as the transverse section of the screw to increase or decrease the forces operating to propel the material through the barrel and mold die. In a similar sense the contour of the liner and the enclosed screw section may be inclined to increase or decrease the pressures operating on the materials throughout the barrel.

It is manifest that I have produced a machine for processing raw materials ordinarily incorporated in plastic or rubber-like molded articles, and by straight line operations uniformly and continuously to conduct measured amounts of the raw material to a densification section where the materials are intimately mixed, broken down and masticated and concomitantly heated to the plastic state by frictional forces alone. Thereafter, the plastic materials are forced by the incoming material into another conveyor section that operates as an extruder, feeding the plastic to the forming mold dies. Labor costs in a machine of the type described are relatively negligible and the factory space and power consumption are considerably reduced.

Those acquainted with the compounding and processing of plastic articles will realize that the machine comprising this invention is readily adapted continuously to compound and/or fabricate varied plastic materials, including the thermosetting molding compositions, the thermoplastic resins or their compounds, as well as the rubber-like materials which pass through substantially the same fabrication steps as those of the related plastic compounds.

It is to be understood that other changes in the details of construction, arrangement and operation may be effected without departing from the spirit of the invention, especially as defined in the following claims:

What I claim is:

1. A machine for continuously compounding and fabricating molding compositions comprising a casing, a mold die mounted on one end of said casing, a rotatable screw within said casing having a section adapted to cooperate with said casing for continuously mixing and kneading the molding composition disposed therebetween, pressure generating means operable through said casing and associated with said kneading section for placing the material therein under pressure, means for delivering a stream of materials to said kneading section without interrupting the kneading operation, means for subdividing a stream of the kneaded material from the kneading section without interrupting the kneading operation, and delivering same to the mold die from which it is extruded as a molded product.

2. A machine for continuously compounding and fabricating molding compositions comprising a casing, a mold die at one end of said casing, a rotatable screw in said casing having a section adapted to cooperate with said casing for continuously mixing and kneading the molding composition disposed therebetween, pressure generating means operable through said casing and associated with said kneading section for placing the material therein under pressure, a supply source containing the raw material to be fabricated, means for continuously subdividing a measured amount of the raw material from the supply source and delivering the material in a stream to said kneading section without interrupting the kneading operation, and means for continuously removing a part of the kneaded material from the kneading section without interrupting the kneading operation and propelling the kneaded material under pressure to the mold die from which it is extruded as a molded product.

3. A fabricating machine as claimed in claim 2, in which the means for subdividing and delivering the molding material comprises a rotatable screw in said casing having a plurality of threads extending to said kneading section, the crests of which are adjacent the inner wall of the casing, said screw being associated with said supply source whereby a measured amount of molded material is removed and delivered to said kneading section.

4. A fabricating machine as claimed in claim 2, in which the means for removing and propelling the kneaded material from the kneading section to the mold die comprises a rotatable screw in said casing having a plurality of parallel threads leading away from said kneading section, the crests of which abut the inner wall of the casing.

5. A machine for continuously compounding and fabricating molding composition comprising a tubular casing having a feed opening at one end thereof, a hopper associated with said opening and containing the molding composition, a rotatable screw in the feed end of said casing for metering a predetermined amount of molding composition and propelling it forward through said casing in a stream, another screw rotatably mounted in an intermediate portion of said casing forming therewith a kneading section, a ram shiftable through said casing and operable through said kneading section for placing the material therein under pressure, a mold die on the other end of said casing, a rotatable screw in the other end portion of said casing for receiving the material from the kneading section and propelling it forward to the mold die causing the material to be extruded therethrough as a molded article, and means for controlling the temperature on the inside of said casing.

6. A machine as claimed in claim 5, in which the screws within the casing comprise an integral member adapted to be driven by a single variable drive.

7. A machine as claimed in claim 5, in which the threads in the feed screw section are spaced apart a distance greater than the threads in the other end screw section.

8. A machine as claimed in claim 5, in which the feed screw section is adapted to convey a larger volume but an equal amount on the weight basis of material than the other end screw section, thereby to cause forces intermediate thereof effecting the densification of the material.

9. A machine for continuously processing molding compositions comprising a casing having a feed end and a delivery end, a screw rotatable within the casing for causing the molding composition to travel from the feed end to the delivery end and having a portion which cooperates with the casing for kneading and homogenizing the molding material passing therethrough, and means shiftable through said casing and cooperating with the kneading portion of said screw for imposing uniform pressure on the molding material disposed within said kneading and homogenizing portion.

10. A machine for continuously processing molding compositions comprising an elongate tubular casing having a feed opening at one end and a delivery port at the other, a screw mounted for rotational movement within said casing for causing the molding composition to travel from the feed to the delivery end and having a portion which cooperates with the casing for masticating the molding material passing therethrough, and means shiftable through said casing and cooperating with said masticating portion of said screw for assisting the masticating action and imposing uniform pressure on the molding material disposed within said masticating portion.

11. A processing machine as claimed in claim 10 in which the screw portion in said masticating portion is formed with a plurality of threads, the crests of which are spaced from the enclosing casing to provide an annular chamber.

12. A processing machine as claimed in claim 10 in which the screw portion disposed within said masticating portion is polygonal in transverse section and curvilinear in longitudinal elevation with the maximum diameter intermediate the ends.

13. A processing machine as claimed in claim 10 in which the means shiftable radially through the casing comprises a ram having an end portion contoured substantially to correspond to the contour of the screw masticating portion, and means constantly urging said ram in the direction towards said screw.

14. A processing machine as claimed in claim 10 in which the means shiftable radially through the casing comprises a ram having an end portion contoured substantially to correspond to the contour of the screw masticating portion, and spring means operatively engaging the outer end of said ram for constantly urging said ram in the direction toward said screw.

15. A machine for continuously compounding molding compositions comprising a casing, a screw rotatable within said casing and having a portion thereof which cooperates with the casing to provide a kneading and mixing section, means shiftable through said casing and into and out of said section for aiding the mixing and kneading action and for placing the molding composition within said section under pressure, means for delivering a stream of molding material to said kneading section without interrupting the kneading operation, and means for subdividing a stream of kneaded material from the kneading section without interrupting the kneading operation.

16. A machine for continuously compounding molding compositions comprising a tubular casing, a rotatable screw co-extensive with said casing and subdivided to effect the compounding in three stages, the first of which is constructed to meter and convey a continuous stream of material to the second stage, the second stage is constructed to masticate and knead the material delivered thereto, the third stage includes a delivery section receiving the kneaded material from the second stage, the screw in first and third stages having single threads, the crests of which substantially engage the inner wall of the casing, the screw in said second stage being curvilinear in longitudinal elevation with the maximum sectional diameter at the center, and ram means shiftable through the casing and operating to provide uniform pressure to the materials within said second stage.

17. A machine as claimed in claim 16 in which the screw portion comprising the second stage is polygonal in transverse section.

18. A machine for continuously compounding molding compositions comprising a casing having a discharge opening at one end, a screw rotatable within said casing for causing molding composition to travel to the discharge opening, said screw having a portion thereof which cooperates with the casing to provide a kneading and mixing section, radially shiftable means cooperating with said kneading and mixing section for placing the molding composition therein under pressure, and means for delivering a stream of molding material substantially axially of said casing to said kneading and mixing section.

IVAN E. BANKEY.

REFERENCES CITED

The following references are of record in the file of this patent:

UNITED STATES PATENTS

| Number | Name | Date |
| --- | --- | --- |
| 1,371,046 | Mosher | Mar. 8, 1921 |
| 1,886,592 | Royle | Nov. 8, 1932 |
| 1,935,050 | Gordon | Nov. 14, 1933 |
| 2,319,859 | Hale | May 25, 1943 |